(12) United States Patent
Wang et al.

(10) Patent No.: US 12,089,119 B2
(45) Date of Patent: Sep. 10, 2024

(54) METHODS AND DEVICES FOR ENABLING GROUP TRANSMISSION IN COMMUNICATION NETWORKS

(71) Applicant: Telefonaktiebolaget LM Ericsson (publ), Stockholm (SE)

(72) Inventors: Min Wang, Luleå (SE); Jan Christoffersson, Luleå (SE); Mårten Ericson, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 403 days.

(21) Appl. No.: 17/604,807

(22) PCT Filed: May 21, 2019

(86) PCT No.: PCT/EP2019/063141
§ 371 (c)(1),
(2) Date: Oct. 19, 2021

(87) PCT Pub. No.: WO2020/233805
PCT Pub. Date: Nov. 26, 2020

(65) Prior Publication Data
US 2022/0182796 A1    Jun. 9, 2022

(51) Int. Cl.
*H04W 4/08*    (2009.01)
*H04W 72/23*    (2023.01)

(52) U.S. Cl.
CPC ............. *H04W 4/08* (2013.01); *H04W 72/23* (2023.01)

(58) Field of Classification Search
CPC ....................................... H04W 4/08
See application file for complete search history.

(56) References Cited

U.S. PATENT DOCUMENTS

| | | |
|---|---|---|
| 2017/0257876 A1 | 9/2017 | Loehr et al. |
| 2018/0139724 A1 | 5/2018 | Loehr et al. |
| 2019/0254091 A1 | 8/2019 | Kim et al. |

FOREIGN PATENT DOCUMENTS

| | | |
|---|---|---|
| WO | 2015163798 A1 | 10/2015 |
| WO | 2017182068 A1 | 10/2017 |
| WO | 2018004322 A1 | 1/2018 |

OTHER PUBLICATIONS

International Search Report and Written Opinion dated Feb. 4, 2020 for International Application No. PCT/EP2019/063141 filed May 21, 2019, consisting of 13-pages.

(Continued)

*Primary Examiner* — Hsinchun Liao
(74) *Attorney, Agent, or Firm* — Weisberg I.P. Law, P.A.

(57) ABSTRACT

A method for enabling group transmission in a telecommunication network including a group having plurality of devices capable of Device to Device, D2D, communication and a base station. The group has a group coordinator device and the plurality of devices may directly communicate with one another over a D2D side-links. The group coordinator device communicates with the base station over a cellular link. The method includes receiving, by the group coordinator, data from a device of the group utilizing a D2D grant for performing D2D communications within the group. The D2D grant has a D2D time resource indicating a D2D time resource in which the D2D communications are allowed, transmitting, by the group coordinator, the received data to the base station at an uplink, time resource. The uplink time resource is determined by adding a fixed, predetermined, time offset to D2D time resource in the grant.

17 Claims, 6 Drawing Sheets

(56) References Cited

OTHER PUBLICATIONS

3GPP TS 22.468 V15.0.0; 3rd Generation Partnership Project; Technical Specification Group Services and System Aspects; Group Communication System Enablers (GCSE) (Release 15), Jun. 2018, consisting of 22-pages.
W. Elmenreich et al.; Building Blocks of Cooperative Relaying in Wireless Systems; University of Klagenfurt, Springer Journal 125, Aug. 14, 2008, consisting of 9-pages.
M. Ericson et al.; UL Group Transmission Concept; GFTE-15:000222 Uen Rev A; Ericsson, Jun. 11, 2015, consisting of 31-pages.
3GPP TS 23.468 V15.0.0; 3rd Generation Partnership Project; Technical Specification Group Services and System Aspects; Group Communication System Enablers for LTE (GCSE_LTE) Stage 2 (Release 15), Dec. 2017, consisting of 32-pages.
3GPP TS 38.321 V15.2.0; 3rd Generation Partnership Project; Technical Specification Group Radio Access Network; NR; Medium Access Control (MAC) protocol specification (Release 15), Jun. 2018, consisting of 73-pages.
3GPP TS 38.214 V15.2.0; 3rd Generation Partnership Project; Technical Specification Group Radio Access Network; NR; Physical layer procedures for data (Release 15), Jun. 2018, consisting of 95-pages.
EPO Communication dated Feb. 22, 2024 for Patent Application No. 19727600.9, consisting of 10 pages.

METHODS AND DEVICES FOR ENABLING GROUP TRANSMISSION IN COMMUNICATION NETWORKS

CROSS-REFERENCE TO RELATED APPLICATIONS

This application is a Submission Under 35 U.S.C. § 371 for U.S. National Stage Patent Application of International Application Number: PCT/EP2019/063141, filed May 21, 2019 entitled "METHODS AND DEVICES FOR ENABLING GROUP TRANSMISSION IN COMMUNICATION NETWORKS," the entirety of which is incorporated herein by reference.

TECHNICAL FIELD

The present disclosure is generally related to the telecommunication networks and more specifically to 2 hop transmission in Long Term Evolution, LTE, networks.

BACKGROUND

Device to Device, D2D, group communication may be a way to increase the uplink coverage and user bit rate for example in a future high frequency Fifth Generation, 5G, network. On a high level, a group of User Equipment, UEs, or sensors are D2D capable, and when a UE has data to transmit it will first distribute this data to neighbouring UEs in the group over the D2D or Side Link (SL). In a second step, the UEs in the group will cooperatively transmit the data over the cellular Up Link, UL. The cooperative transmission will increase the UL coverage, for example by combining several UEs, the total output power and may be beneficial from a latency point of view compared to repeated transmissions for coverage, as used for example in Long Term Evolution, LTE, narrowband. Such a D2D group communication may also be referred to as a 2-hop group transmission.

In such a 2-hop group transmission concept, when one UE in the group wants to transmit data through the group, it sends its data over the side link to the other users in the group. Thereafter in a 2nd hop, the data is sent in a synchronized manner from the UEs in the group over the cellular UL to the network node—evolved Node B, eNB, or a Next Generation Node B, GNB.

In the Down link, DL, the network transmits data to the group as if it was a single UE. At least one UE in the group must be able to receive the DL data. If necessary, the DL data is relayed to the other UEs in the group via D2D.

This is not an entirely new technique and is also known as cooperative relaying or Virtual Antenna Array. With the introduction of a group ID concept, there is no need for an extra radio chain. Furthermore, the UEs in the group are not required to have UL coverage; only one of the UEs in the group must have UL/DL cellular coverage.

There exists support for this to some extent in LTE Third Generation Partnership Project, 3GPP. It is, for example, possible to create groups of UEs transmitting to each other using Proximity based Services as described in 3GPP Rel. 12 LTE. Some information about how normal UL scheduling and resource assignment may be done in LTE and in Prose are described herein.

In 3GPP Technical Specification, TS, 38.321-f00, the Scheduling Request, SR, is used for requesting Uplink-Shared Channel, UL-SCH, resources for new transmission. The Medium Access Control, MAC, entity may be configured with zero, one, or more SR configurations. An SR configuration consists of a set of Physical Uplink Control Channel, PUCCH, resources for SR transmission across different Bandwidth Parts, BWPs, and cells. For a logical channel, at most one PUCCH resource for SR is configured per BWP.

Each SR configuration corresponds to one or more logical channels. Each logical channel may be mapped to zero or one SR configuration, which is configured by Radio Resource Control, RRC. The SR configuration of the Logical Channel, LCH, that triggers the Buffer Status Report, BSR, if such a configuration exists, is considered as corresponding SR configuration for the triggered SR. For BSR triggered by retxBSR-Timer expiry, the corresponding SR configuration for the triggered SR is that of the highest priority LCH that has data available for transmission at the time the BSR is triggered.

A typical scheduling procedure is illustrated in FIG. 2. In an unlicensed spectrum scenario, the UE or the gNB has to perform a channel sensing or Listen Before Talk, LBT, prior to any transmission in this procedure.

The Hybrid Automatic Repeat Request, HARQ, protocol is widely used in Fourth Generation, 4G, and 5G systems and will undoubtedly be used also in future systems to provide fast re-transmissions on the MAC layer. It is used both in UL and DL and can be configured in different ways, e.g. the maximum number of re-transmissions, operating BLER, when and how to retransmit etc. One way to implement the HARQ protocol is to use autonomous re-transmissions, i.e. the transmitter always performs a given number of HARQ retransmission attempts. Autonomous retransmissions are especially suitable in one-to-many or many-to-one communication scenarios since using HARQ feedback from many recipients or reliably transmitting HARQ feedback to many recipients is complicated. With suitable setting for the number of HARQ transmission attempts using autonomous re-transmissions, most of transmission errors can be recovered.

A UE employing Proximity based Service, ProSe, communication can operate in two modes for resource allocation: Scheduled resource allocation (mode 1) and UE autonomous resource selection (mode 2).

Mode 1: For scheduled resource allocation, the UE requests transmission resources from the eNB and the eNB schedules transmission resources for transmission of D2D control and data. For this mode, the UE needs to be RRC_CONNECTED in order to transmit data.

Mode 2: For UE autonomous resource selection, a UE on its own selects resources from resource pools to transmit D2D control and data.

If the UE is out of coverage, it can only use autonomous resource selection, i.e. Mode 2. If the UE is in coverage, it may use scheduled resource allocation or autonomous resource selection as per eNB configuration. When an exceptional case occurs, the UE is allowed to use UE autonomous resource selection temporarily even though it was configured to use scheduled resource allocation. RRC_IDLE UEs can only use autonomous resource selection.

From a transmitter perspective, the ProSe communication UE follows the below procedure for mode 1 communication as shown in FIG. 4.

Step1: UE sends a scheduling request (D-SR or Random Access) to the eNB (same as legacy LTE procedure)

Step2: UE receives resource grant from eNB (same as legacy LTE procedure)

Step3: UE sends a ProSe BSR requesting resource for ProSe communication

Step4: UE receives resource grant for ProSe communication (note that there is no dedicated contention resolution for D2D)

For mode 2 communication, the resource pools are provided by the system broadcast information and UE select the resources from the resource pool. The basic procedure can also be found in FIG. 4.

The procedure for the out-of-coverage case is given in FIG. 5. In this case, the resource pool configuration is obtained from pre-configuration and the UE will selection resource from the pre-configured resource pools and communicated with each other.

Buffer Status Report (BSR) MAC control elements consist of either:

Short BSR and Truncated BSR format: one LCG ID field and one corresponding Buffer Size field; or Long BSR format: four Buffer Size fields, corresponding to LCG IDs #0 through #3.

The BSR formats are identified by MAC PDU sub-headers with LCIDs. The fields LCG ID and Buffer Size are defined as follow:

LCG ID: The Logical Channel Group ID field identifies the group of logical channel(s) which buffer status is being reported. The length of the field is 2 bits. For NB-IoT, the LCG ID is set to #0.

Buffer Size: The Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer. The size of the RLC and MAC headers are not considered in the buffer size computation. The length of this field is 6 bits.

Side link BSR and Truncated Side link BSR MAC control elements consist of one Destination Index field, one LCG ID field and one corresponding Buffer Size field per reported target group.

The Side link BSR MAC control elements are identified by MAC PDU sub-headers with variable sizes. For each included group, the fields are defined as follows:

Destination Index: The Destination Index field identifies the ProSe Destination or the destination for V2X side link communication. The length of this field is 4 bits. The value is set to the index of the destination reported in destinationInfoList for side link communication or is set to one index among index(es) associated to same destination reported in v2x-DestinationInfoList for V2X side link communication. If multiple such lists are reported, the value is indexed sequentially across all the lists in the same order;

LCG ID: The Logical Channel Group ID field identifies the group of logical channel(s) which buffer status is being reported. The length of the field is 2 bits;

Buffer Size: The Buffer Size field identifies the total amount of data available across all logical channels of a LCG of a ProSe Destination after all MAC PDUs for the TTI have been built. The amount of data is indicated in number of bytes. It shall include all data that is available for transmission in the RLC layer and in the PDCP layer. The size of the RLC and MAC headers are not considered in the buffer size computation. The length of this field is 6 bits.

R: Reserved bit, set to "0".

Buffer Sizes of LCGs are included in decreasing order of the highest priority of the sidelink logical channel belonging to the LCG irrespective of the value of the Destination Index field.

The major problem with the existing Prose (LTE D2D) concept is that it cannot support 2-hop group (cooperative) transmission. There are several missing components for this, but the major parts missing is how to create a group with cellular UL capabilities, how to handle the identities in the group and finally how to perform scheduling and prioritization of the 2-hop group transmission. This IvD deals with the problem of performing efficient dynamic scheduling for a 2-hop group transmission.

With the existing dynamic scheduling procedure as discussed in the background section, the coordinator device would request resources for D2D link and cellular link separately, and additional latency would be incurred for the group transmission.

An example of existing dynamic scheduling procedures is illustrated in FIG. 6. As shown in FIG. 6, for every packet of a UE in the group, the group coordinator needs to first send a scheduling request and D2D-BSR to the base station for requesting resources for D2D links in the group. Upon reception of the grants from the base station for D2D links, the data is transmitted in the group, so that every group member including the coordinator receives the data. Based on existing cellular BSR triggering conditions (e.g., arrival of new data in the logical channel group), a cellular BSR (such as LTE/NR BSR) would be triggered. Therefore, the group coordinator transmits a second scheduling request and BSR for the cellular link between the group and the base station. After reception of the second grant which is for the cellular links, the group members thereafter initiate transmissions towards the same base station at a specified time. It is obvious that additional latency for dynamic scheduling procedures would be added to each UP packet. For services with critical latency requirements, such additional latency may be not acceptable.

Therefore, it is necessary to study enhancements to dynamic scheduling to reduce the scheduling latency.

SUMMARY

In a first aspect of the present disclosure, there is presented a method for enabling group transmission in a telecommunication network comprising a group having plurality of devices capable of Device to Device, D2D, communication and a base station, wherein said group further comprises a group coordinator device, wherein said plurality of devices may directly communicate with one another over a D2D side-links and wherein said group coordinator device is arranged to communicate with said base station over a cellular link.

The method comprising the steps of:

receiving, by said group coordinator, data from a device of said group utilizing a D2D grant for performing D2D communications within said group, wherein said D2D grant comprises a D2D time resource indicating a D2D time resource in which said D2D communications are allowed;

transmitting, by said group coordinator, said received data to said base station at an uplink, UL, time resource, wherein said UL time resource is determined by adding a time offset to said D2D time resource comprised by said grant.

One of the advantages of the presented method is that latency and used resourced are reduced. The UL transmission occurs at fixed, predetermined, time offset to said D2D time resource comprised by the grant, thereby omitting the need for additional signalling for determining the UL time resource.

The D2D grant for performing D2D communications may also comprise a D2D frequency resource in addition to the time resource, wherein the frequency resource indicates a frequency band over which said D2D communications may take place.

The present disclosure is thus directed to extend or enhance the known sidelink resource assignment to also include the UL transmissions. This enables group transmission and reduces latency while still being resource efficient.

In accordance with the present disclosure, the method may be deployed in situations where there are periodical SL resources, i.e. using mode 2 of 3GPP SL or configured grants for the sidelink as explained above. In such a way the UL time resource may be periodical such that they have a fixed predetermined time offset with the sidelink grants.

The D2D grant may be utilized with different time resource both on the sidelink and on the uplink in a coordinated way. In an example, the D2D grant on the sidelink and the on uplink may have the same periodicity, TB size, modulation and cooling scheme to minimize processing and latency.

Furthermore, the grants on the UL may have a sufficient time offset from the end of the sidelink transmission opportunity so that once the TB has been sent over the sidelink, it may be transmitted in the next transmission opportunity towards the base station, for example the gNodeB.

As such, the configuration of the grant of the UEs in the group is thus extended or enhanced to include both the sidelink transmission, i.e. the first hop within the group, and for the uplink group transmission, i.e. the second hop within the group.

It may be understood by the skilled person that in the step of transmitting, one or more devices in the group may also transmit data towards the base station, thereby performing the group transmission. The method as disclosed merely refers to the transmission performed by the group coordinator to highlight the fact that at least the group coordinator device is involved in the transmission.

Furthermore, since there are more than one UE in the group, there is a probability that more than one UE transmit each sidelink occasion, wherein the configuration may comprise the order in which the UEs are allowed to use the two-hop group transmission. This particular example will be explained in more detail later below.

According to an example, the time offset may either fixed, predetermined or configurable. The fixed, predetermined, time offset may be chosen such to allow any of the UE's sufficient time for reception and processing before transmitting in the uplink. Alternately, the predetermined time offset may be configurable, for example by a base station. It may be understood by the skilled person that the time offset may be specified to group coordinator device by the base station in signalling message and the coordinator device may choose to accept or reject the time offset based on current conditions at the group coordinator device.

In an example, said method further comprises the initial steps of:
receiving, by said group coordinator device, from said base station said D2D grant for performing D2D communications within said group;
distributing, by said group coordinator, said grant within said group.

In a further example, the D2D grant further comprises a periodicity parameter for indicating a periodicity of said D2D time resource.

In another example, the fixed, predetermined, time offset is smaller than a period of said periodicity of said D2D time resource.

The above allows the UL to be performed before the next D2D grant.

In yet another example, the group coordinator device comprises a priority list of said plurality of devices, wherein said method further comprises the steps of:
receiving, by said group coordinator, data from at least two devices of said group utilizing said D2D grant for performing D2D communications within said group;
transmitting, by said group coordinator, said received data from one of said at least two devices of said group, being the one having the highest priority on said priority list, to said base station at an uplink, UL, time resource, wherein said UL time resource is determined by adding a fixed, predetermined, time offset to said D2D time resource comprised by said grant.

In a further example, the method further comprises the step of:
creating said priority list of said plurality of devices based on any of:
identities of said plurality of devices, and
said received data from said at least two devices of said group.

In a second aspect, there is provided a method for enabling group transmission in a telecommunication network comprising a group having plurality of devices capable of Device to Device, D2D, communication and a base station, wherein said plurality of devices may directly communicate with one another over D2D side-links and wherein said group is arranged to communicate with said base station over a cellular link, said method comprising the steps of:
communicating, by said group, data between said plurality of devices of said group utilizing a D2D grant for performing D2D communications within said group, wherein said D2D grant comprises a D2D time resource indicating a D2D time resource in which said D2D communications are allowed;
transmitting, by said group, said communicated data to said base station at an uplink, UL, time resource, wherein said UL time resource is determined by adding a fixed, predetermined, time offset to said D2D time resource comprised by said grant.

In a third aspect, there is provided a group coordinator arranged for enabling group transmission in a telecommunication network comprising a group having plurality of devices capable of Device to Device, D2D, communication and a base station, wherein said group further comprises a group coordinator device, wherein said plurality of devices may directly communicate with one another over a D2D side-links and wherein said group coordinator device is arranged to communicate with said base station over a cellular link, said group coordinator comprising:
receive equipment arranged for receiving data from a device of said group utilizing a D2D grant for performing D2D communications within said group, wherein said D2D grant comprises a D2D time resource indicating a D2D time resource in which said D2D communications are allowed;
transmit equipment arranged for transmitting said received data to said base station at an uplink, UL, time resource, wherein said UL time resource is determined by adding a fixed, predetermined, time offset to said D2D time resource comprised by said grant.

In an example, the receive equipment is further arranged for receiving from said base station said D2D grant for performing D2D communications within said group, and wherein said group coordinator further comprises:
distribute equipment arranged for distributing said grant within said group.

In a further example, the D2D grant further comprises a periodicity parameter for indicating a periodicity of said D2D time resource.

In another example, the fixed, predetermined, time offset is smaller than a period of said periodicity of said D2D time resource.

In an example, the group coordinator device comprises a priority list of said plurality of devices, wherein said receive equipment is further arranged for receiving data from at least two devices of said group utilizing said D2D grant for performing D2D communications within said group, and wherein said transmit equipment is further arranged for transmitting said received data from one of said at least two devices of said group, being the one having the highest priority on said priority list, to said base station at an uplink, UL, time resource, wherein said UL time resource is determined by adding a fixed, predetermined, time offset to said D2D time resource comprised by said grant.

In a further example, the group coordinator further comprises:
create equipment arranged for creating said priority list of said plurality of devices based on any of:
  identities of said plurality of devices, and
  said received data from said at least two devices of said group.

In a fourth aspect, there is provided a group for enabling group transmission in a telecommunication network comprising said group having plurality of devices capable of Device to Device, D2D, communication and a base station, wherein said plurality of devices may directly communicate with one another over D2D side-links and wherein said group is arranged to communicate with said base station over a cellular link, said group comprising:
communicate equipment arranged for communicating data between said plurality of devices of said group utilizing a D2D grant for performing D2D communications within said group, wherein said D2D grant comprises a D2D time resource indicating a D2D time resource in which said D2D communications are allowed;
transmit equipment arranged for transmitting said communicated data to said base station at an uplink, UL, time resource, wherein said UL time resource is determined by adding a fixed, predetermined, time offset to said D2D time resource comprised by said.

In a fifth aspect, there is provided a computer program product comprising a computer readable medium having instructions which, when executed by a group coordinator, cause said group coordinator to implement a method in accordance with any of the examples as provided above.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
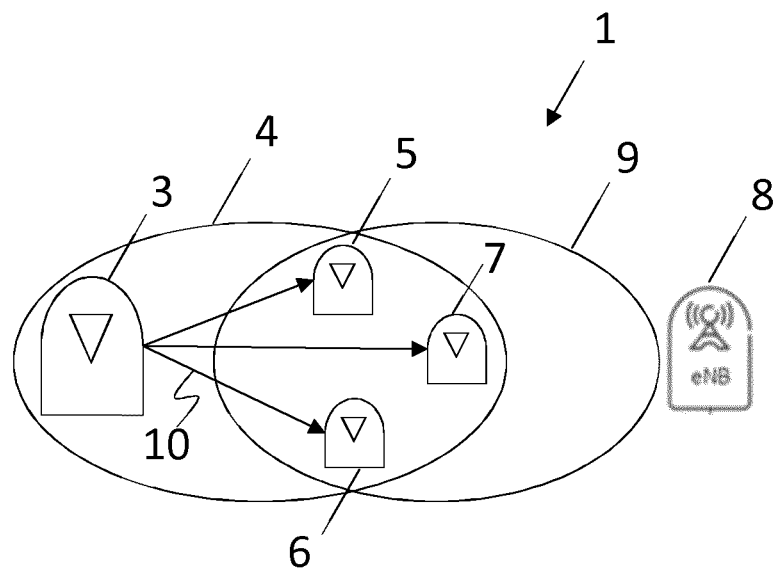
FIG. 1 schematically illustrates a communication network employing side link communication.

FIG. 1 schematically illustrates a communication network employing side link communication. Such a transmission involving both side link and Up/down link transmissions may also be referred to as a 2-hop transmission. A communication network 1 comprises a plurality of devices 3, 5, 6, 7. A group 4 may be formed by a device 3, wherein the group 4 comprises of devices 5, 6, 7 falling within the range of the device 3. Furthermore, the device 3 may not be in direct communication with a base station 8 having a coverage area 9, whereas other devices 5, 6, 7 etc. may fall within the range of base station 8.

Figure 2:
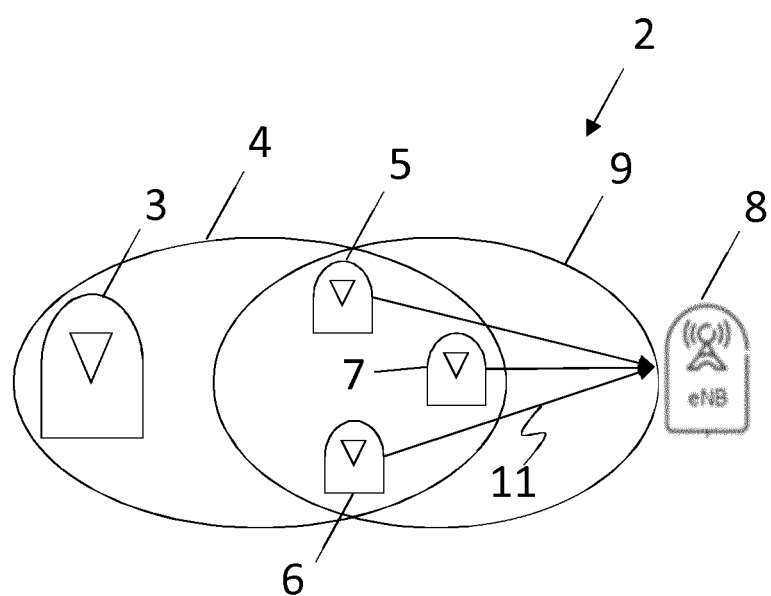
FIG. 2 schematically illustrates a communication network employing cooperative transmission.

When one device 3 in the group want to transmit data through the group, it sends 10 its data over the side link to the other devices in the group. The second hop of such a transmission system is illustrated in FIG. 2 by reference number 2. The data is sent 11 in a synchronized manner from the devices 5, 6, 7 in the group over the cellular up link to the base station 8. The skilled person understands that although FIGS. 1, and 2 illustrate the situation during an uplink process, a similar procedure may be adopted during downlink transmission. In the downlink, the base station 8 transmits data to the group 4 as if it was a single User Equipment, UE. At least one UE in the group must be able to receive the DL data. If necessary, the DL data is relayed to the other devices in the group via Device to Device, D2D.

Figure 3:
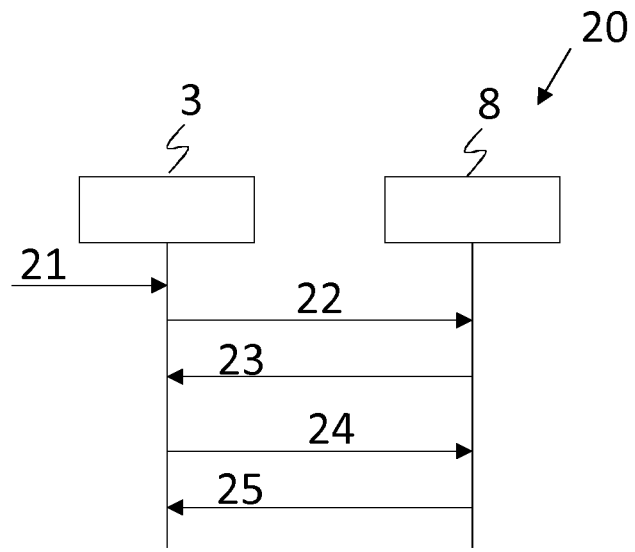
FIG. 3 schematically illustrates a typical dynamic scheduling procedure, according to the prior art.

FIG. 3 schematically illustrates a typical dynamic scheduling procedure 20, according to the prior art. When new data, that is to be transmitted, arrives 21 at a UE 3, a scheduling request 22 is sent to the base station 8. The base station 8 typically sends 23 a small grant that allows the UE 3 to provide the Buffer Status Report, BSR, to the base station 8. Based on the received grant 23, the UE 3 sends 24 the BSR and an indication of the amount of data to the base station 8. The base station 8, then provides 25 a grant for the rest of the data.

Figure 4:
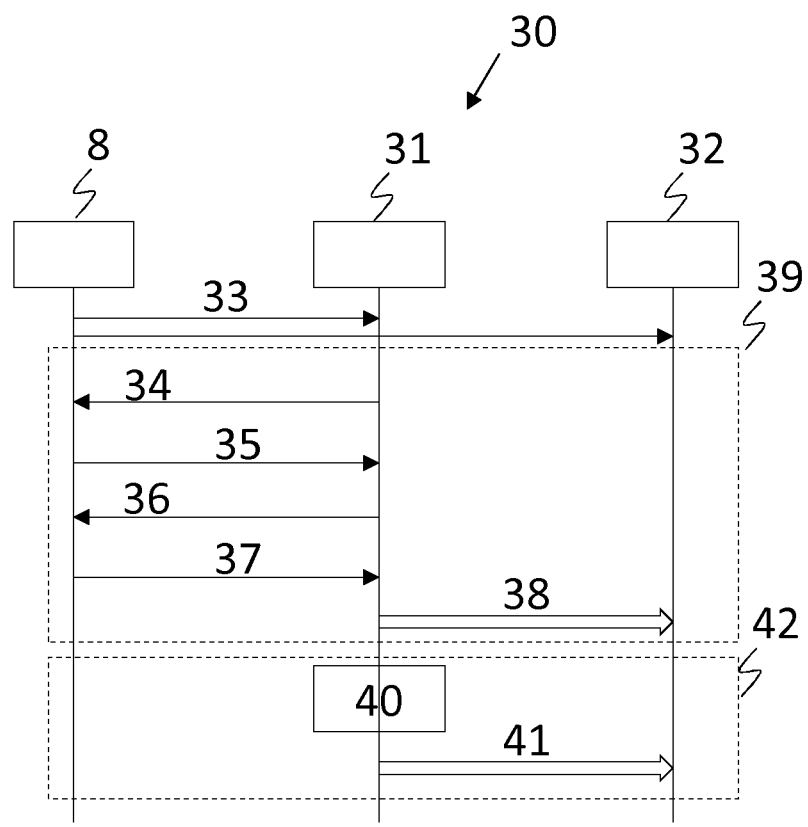
FIG. 4 schematically illustrates a Device to Device, D2D communication procedure for a device that is within coverage of a base station.

FIG. 4 schematically illustrates a Device to Device, D2D communication procedure 30 for a device that is within coverage of a base station. The procedure 30 illustrates two possible modes, 39 and 42, of operation. For ease of reference, they may be referred to as Mode 1, 39 and Mode 2, 42 respectively. In a first step of configuration, 33, the base station 8 configures the various devices 31, 32 within the communication network and provides an indication of the available resources. In mode 1 communication, the transmitter sends 34 a scheduling Request, SR, to the base station 8. Subsequently, the transmitter 31 receives 35 a resource grant from the base station 8.

A second request, specifically a ProSe BSR, requesting resource for ProSe communication is sent 36. When a corresponding grant 37 is received, the transmitter 31 can proceed with D2D communication 38 the remaining devices in the group. It may be noted here that there is no dedicated contention resolution for D2D. For mode 2 communication 42, the resource pools are provided by the system broadcast information in step 33, and the transmitter 31 selects 40 the resources from the resource pool and subsequently performs 41 the D2D communication.

Figure 5:
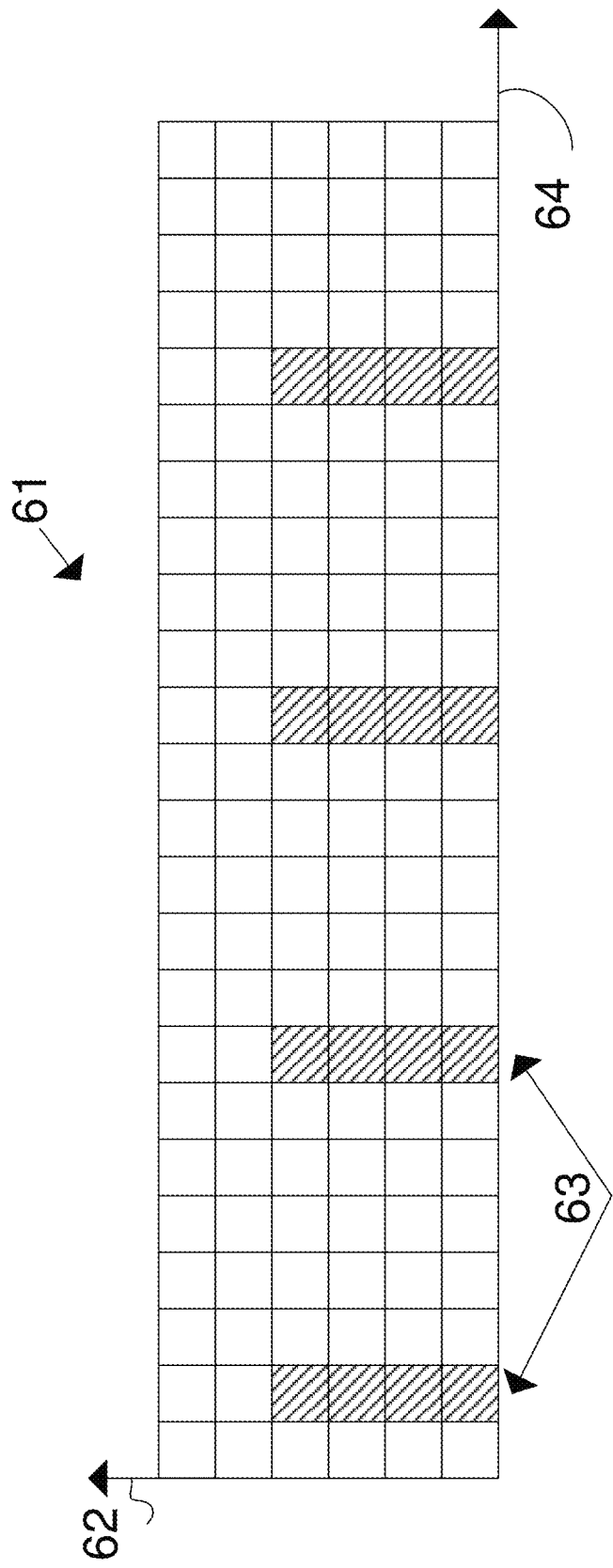
FIG. 5 schematically illustrates a figure for mode 2 Resource Pools for sidelink transmission.

FIG. 5 schematically illustrates a figure 61 for mode 2 Resource Pools for sidelink transmission.

Here, the vertical axis 62 denotes the physical resource blocks for a group. Here, any device, i.e. UE, in the group may use these PRB's for sidelink communication.

The horizontal axis 6 denotes the time, and reference numeral 63 indicates the occasion of the actual sidelink transmission.

As shown, the sidelink transmission is periodical. This thus indicates a mode 2 sidelink communication. It is noted that this particular communication is similar to the one with configured grants, i.e. a UE may be able to transmit at certain time instances.

Figure 6:
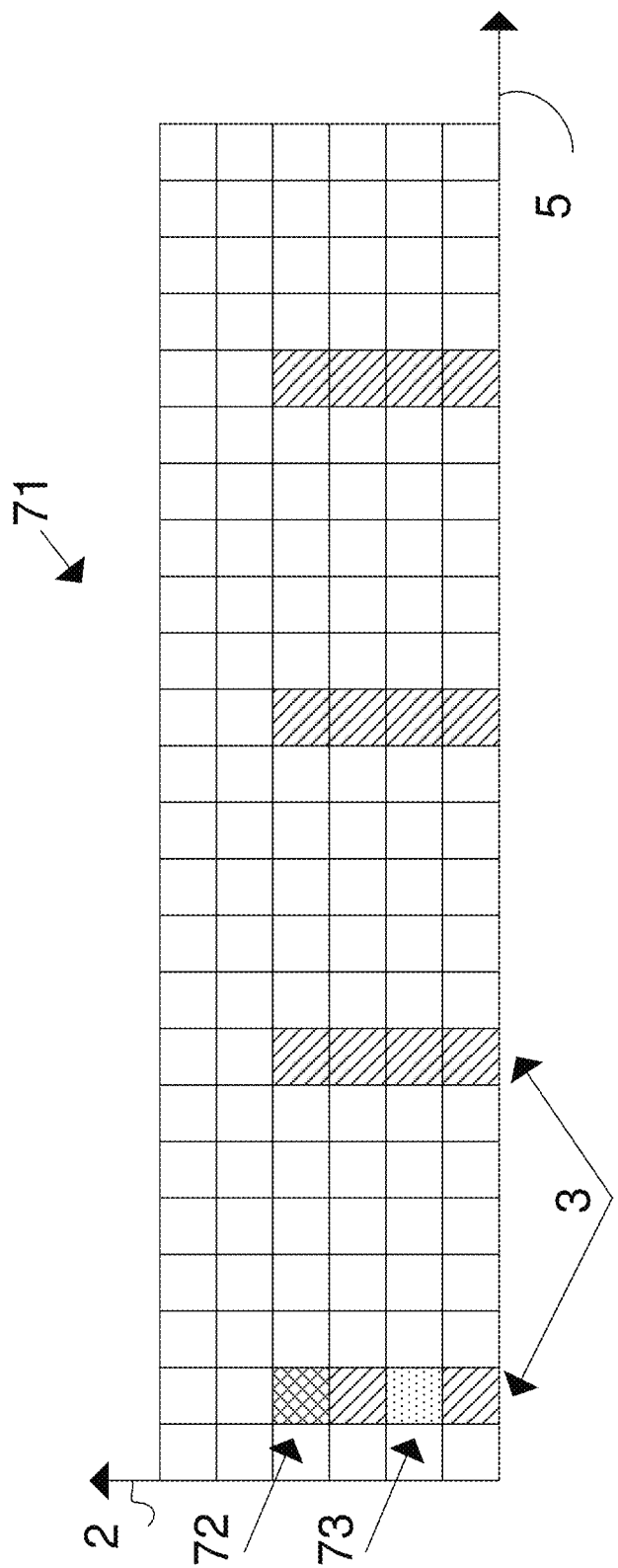
FIG. 6 schematically illustrates a figure for sidelink communication which does not have support for a two-hop group transmission.

FIG. 6 schematically illustrates a figure 71 for sidelink communication which does not have support for a two-hop group transmission.

One of the issues with the known ProSe, i.e. LTE D2D, concept is that it is not able to support two-hop group, i.e. cooperative, transmission. Here, the first hop indicates sidelink communication, i.e. communication within a group, and the second hop means uplink communication, i.e. communication from the group to a base stateion.

There are several missing components for this, but parts that are missing are related to how to create a group with cellular UL capabilities, how to handle the identities in the group and finally how to perform scheduling and prioritization of the 2-hop group transmission.

The present disclosure deals with the scheduling and prioritization of the 2-hop transmission using configured grants. The underlying problem is first how to first distribute the data reliably and fast over the sidelink within the group, i.e. the 1st hop, and when this has been completed, further transmit the data reliably, fast and coordinated towards the base station, gNB, i.e. the 2nd hop.

FIG. 6 illustrates this particular issue. it is possible to perform a transmission within the group, for example using autonomous SL communication or via dedicated SL assignment, but there is no support for the next 2nd hop, i.e. the group to eNB transmission.

For example, reference numeral 72 indicates that a particular first device, i.e. first UE, transmits data to the group using a particular physical resource block and, at the same time, reference numeral 73 indicates that a particular second device, i.e. a second UE, transmits data to the group using another particular physical resource block. The sidelink communication scheme is, again, periodic. As is shown, there is no uplink scheduled, i.e. an uplink communication from the group to the base station.

Figure 7:
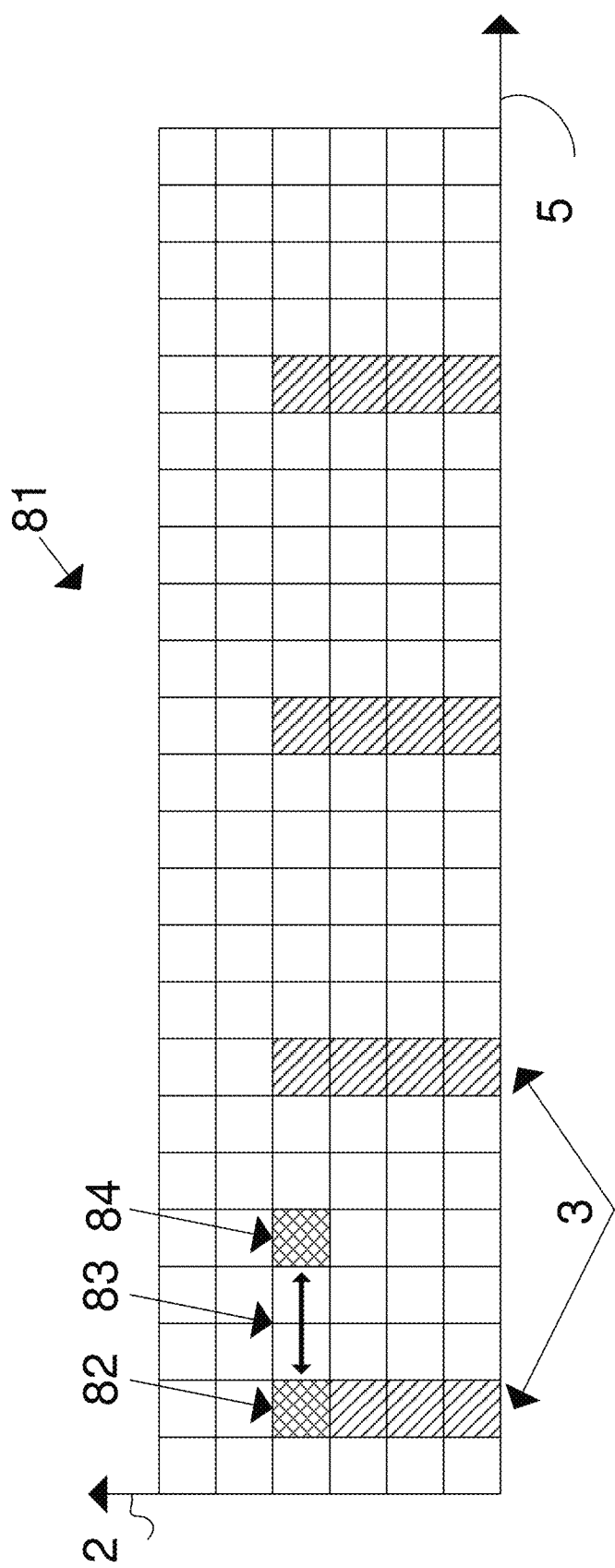
FIG. 7 schematically illustrates an example of a two-hop transmission in accordance with the present disclosure.

FIG. 7 schematically illustrates an example 81 of a two-hop transmission in accordance with the present disclosure.

The present disclosure is directed to the scheduling and prioritization for a group transmission, i.e. UL cooperative transmission, using 3GPP D2D.

The present disclosure proposes to extend/enhance the standard SL resource assignment to also include the UL transmissions. This enables group transmission and reduces latency while still being resource efficient.

The presented solution may assume a periodical SL resources, as is also shown in FIG. 7, i.e. using mode 2 of 3GPP SL or configured grants for the SL. One way to do this is utilize same grant with different time resource both on the SL and on the UL in a coordinated way. In the first example, the grants on the SL and on the UL may have the same periodicity, TB size, modulation and coding scheme to minimize processing and latency.

Furthermore, the grants on the UL would have a sufficient time offset from the end of the SL transmission opportunity so that once the TB has been sent over the SL link, it can be transmitted in the next transmission opportunity towards the gNB.

FIG. 7 indicates the sidelink communication of a particular UE in the group, which is shown with reference numeral 82, and shown the group UL transmission towards the base station, i.e. as indicated with reference numeral 84.

The UL transmission is scheduled based on the same grant, i.e. D2D grant, as for the sidelink communication. However, a fixed time delay as indicated with reference numeral 83 is introduced before the UL transmission occurs.

The configuration of the grants of the UEs in the group is thus extended/enhanced to include both the SL transmission (1st hop within the group) and for the UL group transmission (2nd hop).

Furthermore, since there are more than one UE in the group and there is a probability that more than one UE transmit each SL occasion, the configuration includes the order in which the UEs are allowed to use the 2-hop group transmission As a first example, a configured grant issued to the group is used also on the SL with a different time offset to enable needed processing of the received SL transmission to make it ready for transmission on the next configured grant on the UL as shown in FIG. 7. Here the configured grant on the UL is used by the group to transmit jointly to the gNB. In this case the configured grant on the SL and UL would have the same periodicity, TBS, modulation and coding. This means that once the MAC PDU has been transmitted over the SL, it is immediately ready to be transmitted in the UL with minimum additional processing when the time offset has expired.

Figure 8:
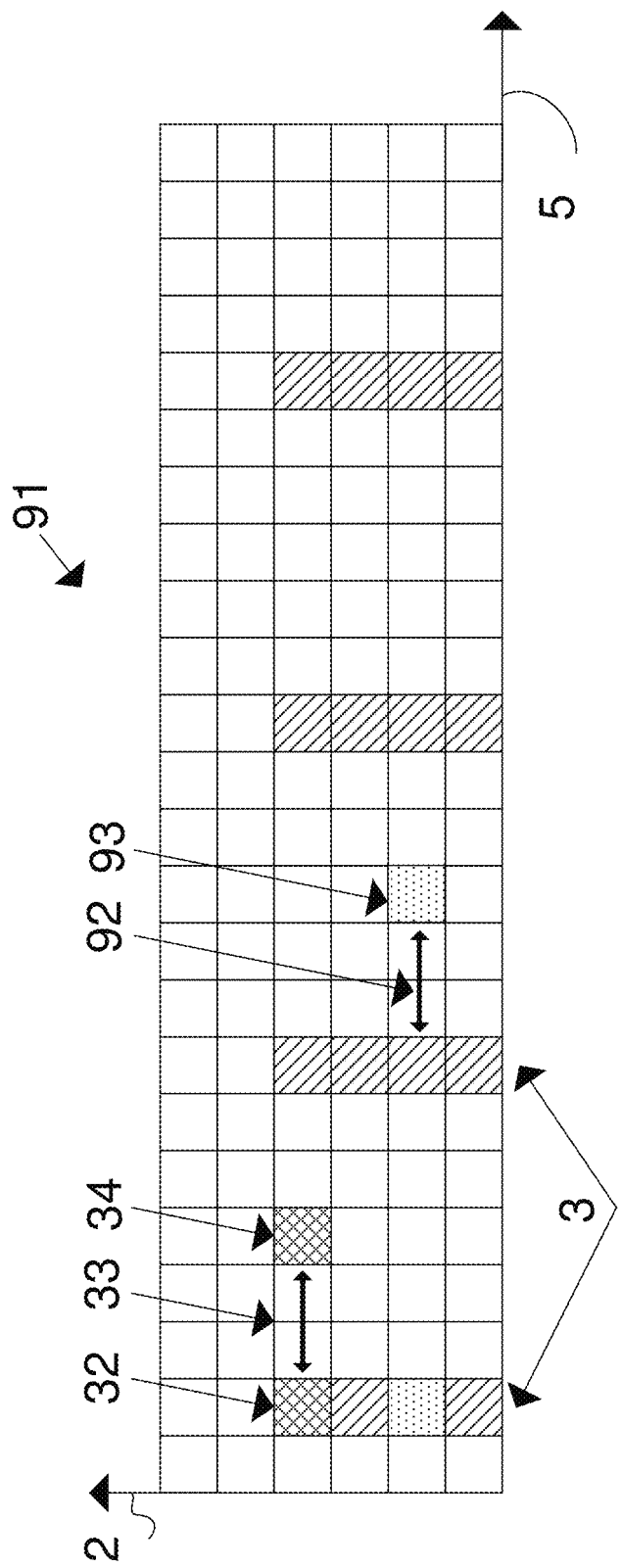
FIG. 8 schematically illustrates another example of a two-hop transmission in accordance with the present disclosure.

As a second example to increase reliability and enable a larger group of transmitting UEs (where some UEs may have bad D2D coverage), the configured grant issued to the group on the SL link is combined with autonomous retransmissions. In this case, the TB is transmitted several times (consecutive slots) over the SL link so that a large number of UEs in the group receive it and can transmit jointly on the first available configured grant in the UL. This embodiment would increase UL coverage due to more UEs participating in the group, but at the cost of higher latency. This is shown in FIG. 8. In this case the configuration of the offset is compared to the end of the transmission opportunity on the SL.

In a third example, the configured grant to the group on the SL has repetitions on different frequencies, as shown in FIG. 9. In this case the same TB is transmitted over different PRBs in the same slot. This has the advantage that it reduces latency compared to when repetitions are done in time.

The fourth example is suitable when different UEs having data to send may have colliding transmissions on the SL. In this example, different configured grants on the SL (frequency multiplexed) are issued to different users in the group to avoid SL collisions. In this case, different users can have different priorities so in case several UEs use transmit on the SL simultaneously, the MAC PDU from the UE with highest priority is selected and transmitted by the group on the configured grant in the UL. The MAC PDU from the other UE(s) is buffered by the group and transmitted at the next transmission opportunity given by the configured grants in the UL. See FIG. 8 for an illustration. The priorities of the UEs may be based on the priorities of the data the UEs transmit or just the UE id or on a combination of data priority and UE id.

Here it is shown that the UE associated with reference numeral 32 is prioritized above the UE associated with reference numeral 93. Both intend have data to send to the base station, however, due to a prioritization, first the data of the first UE 32 is sent 34 after the introduced delay 3. Then, in a next period, also with the same delay 92, the second UE is able to transmit 93 its data towards the base station, for example via the group coordinator.

As a fifth example, the SL resources are individual per UE in the group (e.g. one PRB used per UE) as in example 4. However, on the UL the grant is shared by the UEs in the group and the prioritization of example 4 is used to determine which UEs data is transmitted. This minimizes the needed allocation of configured grants needed in the UL, since instead of one configured grant per UE in the group, all UEs in the group can share a single configured grant. This is illustrated in FIG. 11.

As a sixth example, the offset is given as a requirement for the UE to meet to be able to join the group. In case a UE cannot fulfil the requirement of receiving a SL transmission in time (subframe, slot, mini-slot, symbol) x and transmitting the same MAC PDU (content, TB size, modulation and coding scheme) on a configured grant in the UL at time x+offset, it is not allowed to join the group.

As a seventh example, the offset is signaled to the group via RRC signaling. In the NR spec, the offset may be included in the RRC IE, ConfiguredGrantConfig. In the LTE spec, the offset may be included in the RRC IE, SPS-Config. There may be multiple configured grant configurations defined in the group catering for transmissions of different services. In this case, multiple timing offset values need to be configured accordingly.

As an eighth example, the offset is signaled to the group via other signaling means such as a MAC CE or a DCI signaling. For the former option, the MAC CE carries the offset. For the latter option, the offset may be signaled in a DCI intended for activation/deactivation of a configured grant.

For any of the above examples, the timing gap/offset between two grants (SL and UL) is configured by the gNB, which allows the group sufficient time to process the data (reception of data from D2D links and prepare for data transmission on cellular links). The timing offset may be configured depending on the numerology/subcarrier spacing (SCS) associated with the grants.

Within the scope of the present disclosure, the term "device" may refer to User Equipment, or any other device capable of communicating using a side link. Particularly the term may refer to sensors or array of sensors such as found in an Internet of Things, IoT, network.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid state medium supplied together with or as part of other hardware, but may also be distributed in other forms, such as via the internet or wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method for enabling group transmission in a telecommunication network comprising a group having plurality of devices capable of Device to Device, D2D, communication and a base station, the group including a group coordinator device, the plurality of devices directly communicating with one another over a D2D side-links and the group coordinator device being arranged to communicate with the base station over a cellular link, and the group coordinator device comprising a priority list of the plurality of devices, the method comprising:
   receiving, by the group coordinator device, data from at least two devices of the group utilizing a D2D grant for performing D2D communications within the group, the D2D grant including a D2D time resource indicating a D2D time resource in which the D2D communications are allowed; and
   transmitting, by the group coordinator device, the received data from one of the at least two devices of the group, to the base station at an uplink, UL, time resource, the one device having the highest priority on the priority list, and the UL time resource being determined by adding a fixed, predetermined time offset to the D2D time resource included in the D2D grant.

2. The method in accordance with claim 1, wherein the method further comprises:
   receiving, by the group coordinator device, from the base station, the D2D grant for performing the D2D communications within the group; and
   distributing, by the group coordinator device, the D2D grant within the group.

3. The method in accordance with claim 1, wherein the D2D grant further includes a periodicity parameter for indicating a periodicity of the D2D time resource.

4. The method in accordance with claim 3, wherein the fixed, predetermined time offset is smaller than a period of the periodicity of the D2D time resource.

5. The method in accordance with claim 1, wherein the method further comprises:
   creating the priority list of the plurality of devices based on any of:
      identities of the plurality of devices; and
      the received data from the at least two devices of the group.

6. The method in accordance with claim 1, wherein the method further comprises:

receiving, by the group coordinator device, from the base station the D2D grant for performing the D2D communications within the group; and distributing, by the group coordinator, the D2D grant within the group.

7. The method in accordance with claim 1, wherein the D2D grant further includes a periodicity parameter for indicating a periodicity of the D2D time resource.

8. The method in accordance with claim 7, wherein the fixed, predetermined time offset is smaller than a period of the periodicity of the D2D time resource.

9. A group coordinator device configured for enabling group transmission in a telecommunication network comprising a group having plurality of devices capable of Device to Device, D2D, communication and a base station, the group including the group coordinator device, the plurality of devices directly communicating with one another over a D2D side-links and the group coordinator device being arranged to communicate with the base station over a cellular link, and the group coordinator device including a priority list of the plurality of devices, the group coordinator device comprising:

receive equipment configured to receive data from at least two devices of the group utilizing a D2D grant for performing D2D communications within the group, the D2D grant including a D2D time resource indicating a D2D time resource in which the D2D communications are allowed; and transmit equipment configured to transmit the received data from one of the at least two devices of the group, to the base station at an uplink, UL, time resource, the one device having the highest priority on the priority list, the UL time resource being determined by adding a fixed, predetermined time offset to the D2D time resource included in the D2D grant.

10. The group coordinator device in accordance with claim 9, wherein the receive equipment is further configured for receiving from the base station the D2D grant for performing the D2D communications within the group, and wherein the group coordinator device further comprises:

distribute equipment configured to distribute the D2D grant within the group.

11. The group coordinator device in accordance with claim 10, wherein the D2D grant further includes a periodicity parameter for indicating a periodicity of the D2D time resource.

12. The group coordinator device in accordance with claim 11, wherein fixed, predetermined time offset is smaller than a period of the periodicity of the D2D time resource.

13. The group coordinator device in accordance with claim 10, wherein the group coordinator further comprises:

create equipment configured to create the priority list of the plurality of devices based on any of:
identities of the plurality of devices; and
the received data from the at least two devices of the group.

14. The group coordinator device in accordance with claim 9, wherein the D2D grant further comprises a periodicity parameter for indicating a periodicity of the D2D time resource.

15. The group coordinator device in accordance with claim 14, wherein fixed, predetermined time offset is smaller than a period of the periodicity of the D2D time resource.

16. The group coordinator device in accordance with claim 14, wherein the group coordinator device further comprises:

create equipment configured to create the priority list of the plurality of devices based on any of:
identities of the plurality of devices; and
the received data from the at least two devices of the group.

17. The group coordinator device in accordance with claim 9, wherein the group coordinator device further comprises:

create equipment configured to create the priority list of the plurality of devices based on any of:
identities of the plurality of devices; and
the received data from the at least two devices of the group.

* * * * *